(12) United States Patent
Suzuki

(10) Patent No.: US 7,859,823 B2
(45) Date of Patent: Dec. 28, 2010

(54) MULTI-LAYERED CERAMIC ELECTRONIC COMPONENT

(75) Inventor: Koji Suzuki, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 108 days.

(21) Appl. No.: 12/117,123

(22) Filed: May 8, 2008

(65) Prior Publication Data

US 2008/0304204 A1    Dec. 11, 2008

(30) Foreign Application Priority Data

Jun. 8, 2007  (JP) .............................. 2007-153110
Apr. 24, 2008 (JP) .............................. 2008-114310

(51) Int. Cl.
*H01G 4/06* (2006.01)
(52) U.S. Cl. .................................... 361/321.1; 361/311
(58) Field of Classification Search ................ 361/311, 361/321.1, 321.2, 321.3, 321.4, 321.5
See application file for complete search history.

(56) References Cited

U.S. PATENT DOCUMENTS

| | | | |
|---|---|---|---|
| 6,118,647 A * | 9/2000 | Okinaka et al. ............. | 361/305 |
| 6,301,092 B1 * | 10/2001 | Hata et al. ................ | 361/321.2 |
| 6,656,863 B2 * | 12/2003 | Fukui et al. ............... | 501/136 |
| 7,239,501 B2 * | 7/2007 | Hiramatsu et al. ......... | 361/321.4 |
| 7,271,115 B2 * | 9/2007 | Suzuki ..................... | 501/138 |
| 7,298,603 B2 * | 11/2007 | Mizuno et al. ............. | 361/303 |
| 7,396,711 B2 * | 7/2008 | Shah et al. ................ | 438/164 |
| 7,538,057 B2 * | 5/2009 | Ito et al. .................. | 501/137 |
| 2003/0147198 A1 * | 8/2003 | Konaka et al. ............. | 361/311 |
| 2004/0145856 A1 * | 7/2004 | Nakamura et al. .......... | 361/311 |
| 2005/0117274 A1 * | 6/2005 | Miyauchi et al. ......... | 361/321.2 |
| 2005/0128683 A1 * | 6/2005 | Watanabe et al. ........ | 361/321.4 |

FOREIGN PATENT DOCUMENTS

| JP | 56-94719 A | 7/1981 |
|---|---|---|
| JP | 2000-340450 A | 12/2000 |
| JP | 2004-096010 A | 3/2004 |
| JP | 2005-101301 A | 4/2005 |

OTHER PUBLICATIONS

Official Communication issued in corresponding Japanese Patent Application No. 2008-114310, mailed on Dec. 8, 2009.

* cited by examiner

*Primary Examiner*—Eric Thomas
(74) *Attorney, Agent, or Firm*—Keating & Bennett, LLP

(57) ABSTRACT

In a sintered ceramic body including side gap portions arranged between sides of first and second internal electrodes and first and second side surfaces of the sintered ceramic body and between sides of the effective layer portion and the first and second side surfaces of the sintered ceramic body, regions of the side gap portions at least adjacent to the first and second internal electrodes are Mg-rich regions each having a Mg concentration greater than that of the effective layer portion.

10 Claims, 11 Drawing Sheets

MULTI-LAYERED CERAMIC ELECTRONIC COMPONENT

BACKGROUND OF THE INVENTION

1. Field of the Invention

The present invention relates to ceramic electronic components, and more specifically, it relates to a multi-layered ceramic electronic component including ceramic layers and internal electrodes to generate capacitance.

2. Description of the Related Art

In recent years, as electronic apparatuses, such as mobile phones and portable music players, are being downsized, electronic components to be mounted thereon have been downsized. For example, in multi-layered chip ceramic electronic components typified by multi-layered chip ceramic capacitors, in order to reduce the chip size while maintaining desired properties, the thickness of their ceramic layers has been reduced.

With the reduction in the thickness of the ceramic layers, there is a tendency to stack a greater number of thin ceramic layers. Usually, a multi-layered ceramic electronic component includes ceramic layers and internal electrodes that are alternately stacked. The internal electrodes do not completely cover the ceramic layers so as not to be exposed at side surfaces of the chip. The internal electrodes are arranged at inner locations of the ceramic layers and away from peripheries of the ceramic layers, thus causing differences in the level between the internal electrodes and the ceramic layers. An increase in the number of stacked ceramic layers is likely to cause structural defects, such as delamination, due to such level differences.

To overcome the foregoing problems, for example, a method for offsetting the level differences is disclosed in Japanese Unexamined Patent Application Publication No. 56-94719. The method includes printing an internal electrode pattern onto ceramic green sheets and then applying a ceramic paste to portions at which the internal electrode pattern is not printed.

In the method described above, the level differences between ceramic layers and internal electrodes are prevented. However, minute gaps are formed between ends of the internal electrodes and the ceramic layers during firing due to differences in shrinkage behavior during sintering between the internal electrodes and the ceramic layers. Then, water and moisture can penetrate into the gaps. Thus, the chip has poor resistance to moisture.

As a technique associated with Japanese Unexamined Patent Application Publication No. 56-94719 described above, a method is disclosed in Japanese Unexamined Patent Application Publication No. 2004-96010. According to the method, $SiO_2$ is added to a ceramic paste for offsetting level differences so as to reduce the difference in shrinkage behavior during sintering between the ceramic and the internal electrodes.

Even in the method disclosed in Japanese Unexamined Patent Application Publication No. 2004-96010, however, it is very difficult to completely match the shrinkage behavior during sintering of the ceramic to that of the internal electrodes, and thus, this solution to the problem of poor moisture resistance due to the gaps is not satisfactory.

Portions offsetting the level differences are located near the outer surface of the chip. Thus, the ceramic paste applied to the portions is easily sintered because heat produced in a firing step is easily conducted to the portions. In the method disclosed in Japanese Unexamined Patent Application Publication No. 2004-96010, moreover, the addition of $SiO_2$ to the ceramic paste leads to a further reduction in the sintering temperature. Thereby, gaps located near side surfaces are excessively sintered, which is likely to cause problems of structural defects and a reduction in the strength of the main body of a capacitor.

Furthermore, a method for solving the problem of level differences is disclosed in Japanese Unexamined Patent Application Publication No. 2005-101301. According to the method, Cu is added to a ceramic paste for offsetting level differences so that the Cu in the ceramic paste is alloyed with Ni in internal electrodes, thereby enhancing the bondability between the internal electrodes and level difference offsetting portions. In the method disclosed in Japanese Unexamined Patent Application Publication No. 2005-101301, however, the resulting alloy of Ni and Cu easily undergoes a redox reaction, depending on a firing atmosphere and other factors.

After volume expansion caused by an oxidation reaction occurs, volume reduction caused by a reduction reaction occurs, thus gaps in the level difference offsetting portions are formed. Thus, currently it is difficult to ensure sufficiently reliable moisture resistance for a multi-layered chip.

SUMMARY OF THE INVENTION

To overcome the problems described above, preferred embodiments of the present invention provide a multi-layered ceramic electronic component having highly reliable moisture resistance even when the component has a small size.

A multi-layered ceramic electronic component according to a preferred embodiment of the present invention includes a sintered ceramic body having a plurality of stacked ceramic layers, a first side surface and a second side surface opposing each other, and a first end surface and a second end surface opposing each other, a first internal electrode arranged in the sintered ceramic body, the first internal electrode extending to the first end surface and including Ni, a second internal electrode arranged in the sintered ceramic body so as to oppose the first internal electrode with a specified one of the ceramic layers therebetween, the second internal electrode extending to the second end surface and including Ni, a first external terminal electrode arranged on the first end surface of the sintered ceramic body and electrically connected to the first internal electrode, the first external terminal electrode arranged to have a potential applied thereto, and a second external terminal electrode arranged on the second end surface of the sintered ceramic body and electrically connected to the second internal electrode, the second external terminal electrode arranged to have a potential different from the potential applied to the first external terminal electrode applied thereto. The sintered ceramic body includes an effective layer portion of the ceramic layers arranged between the first internal electrode and the second internal electrode, the effective layer portion contributing to the generation of capacitance, and side gap portions arranged between sides of the first and second internal electrodes and the first and second side surfaces of the sintered ceramic body and between sides of the effective layer portion and the first and second side surfaces of the sintered ceramic body, and in the side gap portions, regions at least adjacent to the first and second internal electrodes are Mg-rich regions each having a Mg concentration greater than that of the effective layer portion.

In preferred embodiments of the present invention, regions of the side gap portions each located on substantially the same level with each of the first and second internal electrodes are preferably the Mg-rich regions.

The entire side gap portions may preferably be the Mg-rich regions.

The sintered ceramic body preferably further includes end gap portions arranged between an end of the first internal electrode, the end not extending to the first end surface, and the second end surface of the sintered ceramic body, between an end of the second internal electrode, the end not extending to the second end surface, and the first end surface of the sintered body, and between ends of the effective layer portion and the first end surface and the second end surface of the sintered ceramic body, and regions of the end gap portions at least adjacent to the first and second internal electrodes are preferably Mg-rich regions each having a Mg concentration higher than that of the effective layer portion.

Preferably, the sintered ceramic body further includes, in the ceramic layers, side gap vertical extensions which are located outside the outermost internal electrodes and vertically extend from the side gap portions and end gap vertical extensions which are located outside the outermost internal electrodes and vertically extend from the end gap portions, and at least either the side gap vertical extensions or the end gap vertical extensions of the ceramic layers may be Mg-rich regions each having a Mg concentration greater than that of the effective layer portion.

Preferably, a first ceramic material for the effective layer portion has a Mg content which is achieved by adding a first amount of Mg to about 100 mol of a primary mixture, and a second ceramic material for the Mg-rich regions has a Mg content which is achieved by adding a second amount of Mg to about 100 mol of the primary mixture, the second amount being about 0.5 mol to about 1.0 mol greater than the first amount, for example.

Each of the Mg-rich regions may have a concentration gradient such that the Mg concentration reduces as a distance from the outside toward the inside of the sintered ceramic body is increasing.

As described above, the multi-layered ceramic electronic component according to preferred embodiments of the present invention includes a sintered ceramic body, a first and a second internal electrode arranged in the sintered ceramic body, a first external terminal electrode electrically connected to the first internal electrode, and a second external terminal electrode electrically connected to the second internal electrode, the sintered ceramic body including side gap portions arranged between sides of the first and second internal electrodes and the first and second side surfaces of the sintered ceramic body and between sides of the effective layer portion and the first and second side surfaces of the sintered ceramic body, and in the multi-layered ceramic electronic component, regions of the side gap portions at least adjacent to the first and second internal electrodes are Mg-rich regions each having a Mg concentration greater than that of the effective layer portion. Thus, an oxidized compound of Ni that is a metal included in the internal electrodes and Mg that is a metal element included in the ceramic material is formed at interfaces between the first and second internal electrodes and the side gap portions. The clearance at the interfaces between the internal electrodes and the side gap portions is filled with the resulting oxidized compound. Moreover, the internal electrodes are bonded to the side gap portions with the oxidized compound, thereby improving moisture resistance. Furthermore, volume expansion caused by the formation of the oxidized compound enhances the effect of filling the clearance at the interfaces between the internal electrodes and the side gap portions, thereby significantly improving the moisture resistance.

The concept that the Mg-rich regions have a Mg concentration greater than that of the effective layer portion is as follows. When the effective layer portion includes Mg, the Mg-rich regions have a Mg content greater than that of the effective layer portion. When the effective layer portion does not include Mg, the Mg-rich regions have a Mg content sufficient to form an oxidized compound of Mg and Ni.

For example, when MgO-added $BaTiO_3$ is used as a reduction-resisting ceramic material for the effective layer portion, the Mg-rich regions must have a Mg content greater than the Mg content of the effective layer portion deriving from the MgO.

In the multi-layered ceramic electronic component according to preferred embodiments of the present invention, in the side gap portions, by forming the regions each located on a level with each of the first and second internal electrodes, i.e., the regions abutting the sides of the internal electrodes, as the Mg-rich regions, an oxidized compound of Ni that is a metal included in the internal electrodes and Mg that is a metal element included in the ceramic material is formed at the interfaces between the sides of the internal electrodes and the side gap portions, thereby improving the moisture resistance.

When the entire side gap portions are the Mg-rich regions, a deterioration of moisture resistance due to the clearance between the internal electrodes and the side gap portions is prevented, which results in a multi-layered ceramic electronic component having more reliable moisture resistance.

The sintered ceramic body further includes end gap portions arranged between an end of the first internal electrode and the second end surface, between an end of the second internal electrode and the first end surface, and between the ends of the effective layer portion and the first end surface or the second end surface, and in the end gap portions. Configuring the regions at least adjacent to the first and second internal electrodes as Mg-rich regions, penetration of water through the end surfaces is prevented, thereby further improving the moisture resistance.

The end surfaces are covered with the external terminal electrodes, and the external terminal electrodes prevent the penetration of water. Thus, in many cases, it is not necessary to include the Mg-rich regions in the end gap portions. However, the arrangement of the Mg-rich regions in the end gap portions further improves the reliability of the moisture resistance.

The sintered ceramic body further includes, in the ceramic layers, side gap vertical extensions which are located outside the outermost internal electrodes and vertically extend from the side gap portions and end gap vertical extensions which are located outside the outermost internal electrodes and vertically extend from the end gap portions, and at least one of the side gap vertical extensions and the end gap vertical extensions may be made as Mg-rich regions having a Mg concentration greater than that of the effective layer portion. In this case, a multi-layered ceramic electronic component having more reliable moisture resistance is obtained.

In the multi-layered ceramic electronic component, a first ceramic material for the effective layer portion has a Mg content which is achieved by adding a first amount of Mg to about 100 mol of a primary material, and a second ceramic material for the Mg-rich regions has a Mg content which is achieved by adding a second amount of Mg to about 100 mol of the primary material, the second amount being about 0.5 mol to about 1.0 mol greater than the first amount. Thereby, the moisture resistance can be effectively improved, which enables preferred embodiments of the present invention to be more effective.

Each of the Mg-rich regions may have a concentration gradient such that the Mg concentration decreases as a distance from the outside toward the inside of the sintered ceramic body increases, which also produces a multi-layered ceramic electronic component having excellent moisture resistance.

An exemplary method for making a structure having the concentration gradient such that Mg concentration decreases as a distance from the outside toward the inside of the sintered ceramic body increases includes a step of dipping a green chip before firing in a binder including Mg to impregnate the chip with Mg and a step of firing the green chip after the dipping.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Features of the present invention will be illustrated below with reference to preferred embodiments of the present invention.

First Preferred Embodiment

Figure 1:
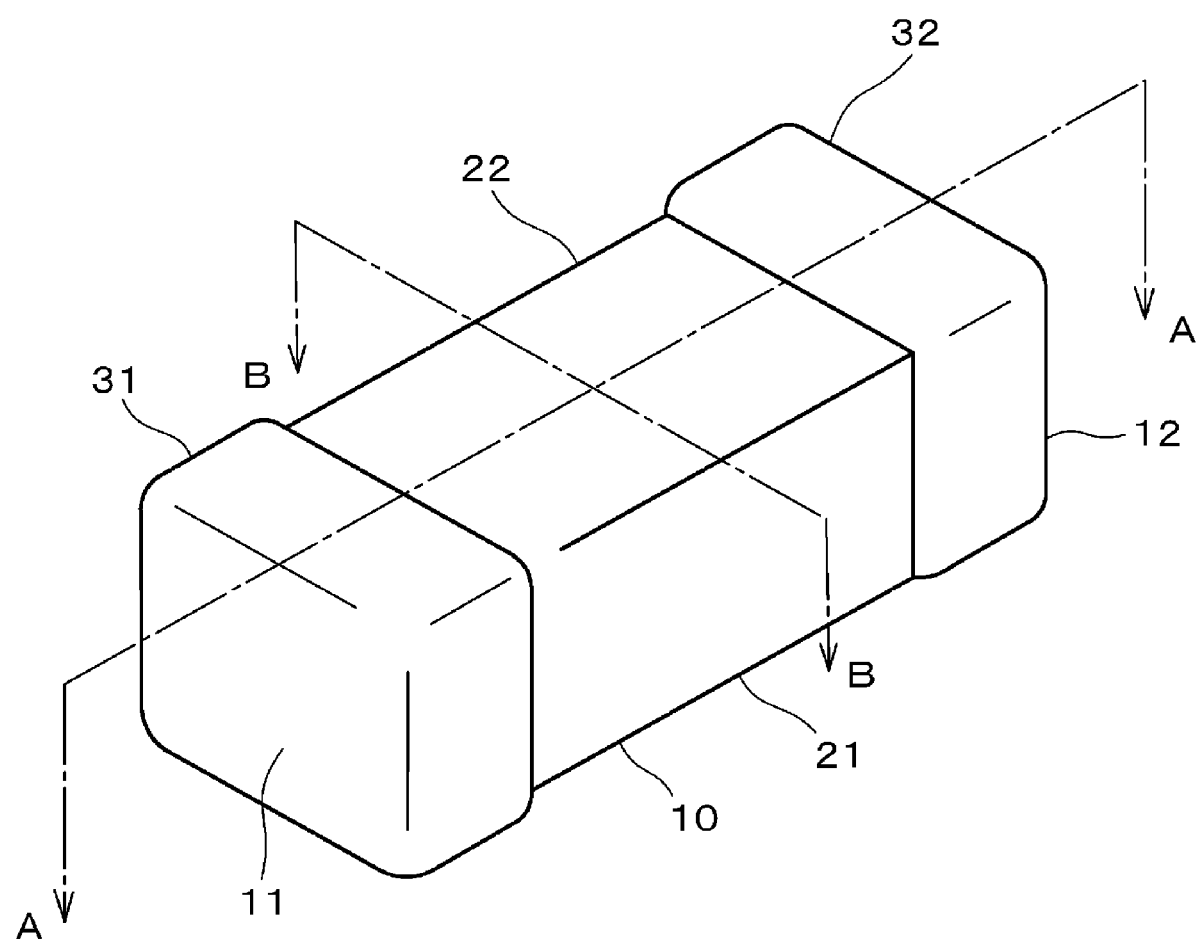
FIG. 1 is a perspective view of a multi-layered ceramic electronic component according to a first preferred embodiment of the present invention.
Figure 2:
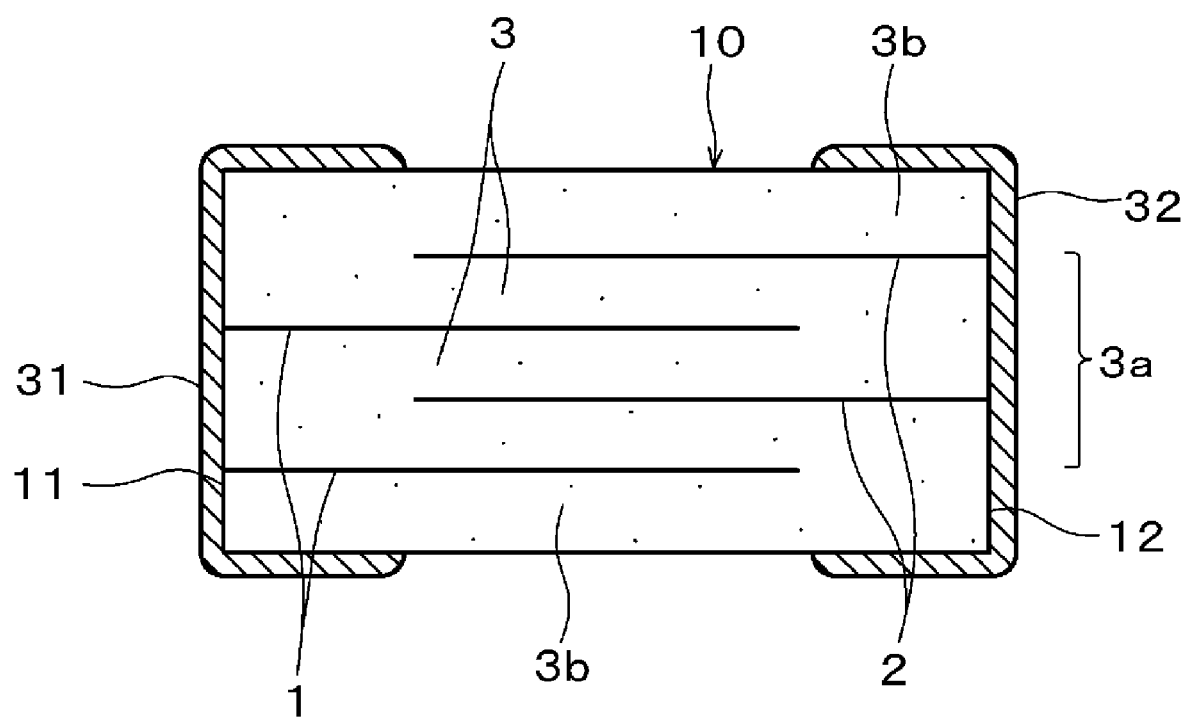
FIG. 2 is a cross-sectional view taken along line A-A in FIG. 1.
Figure 3:
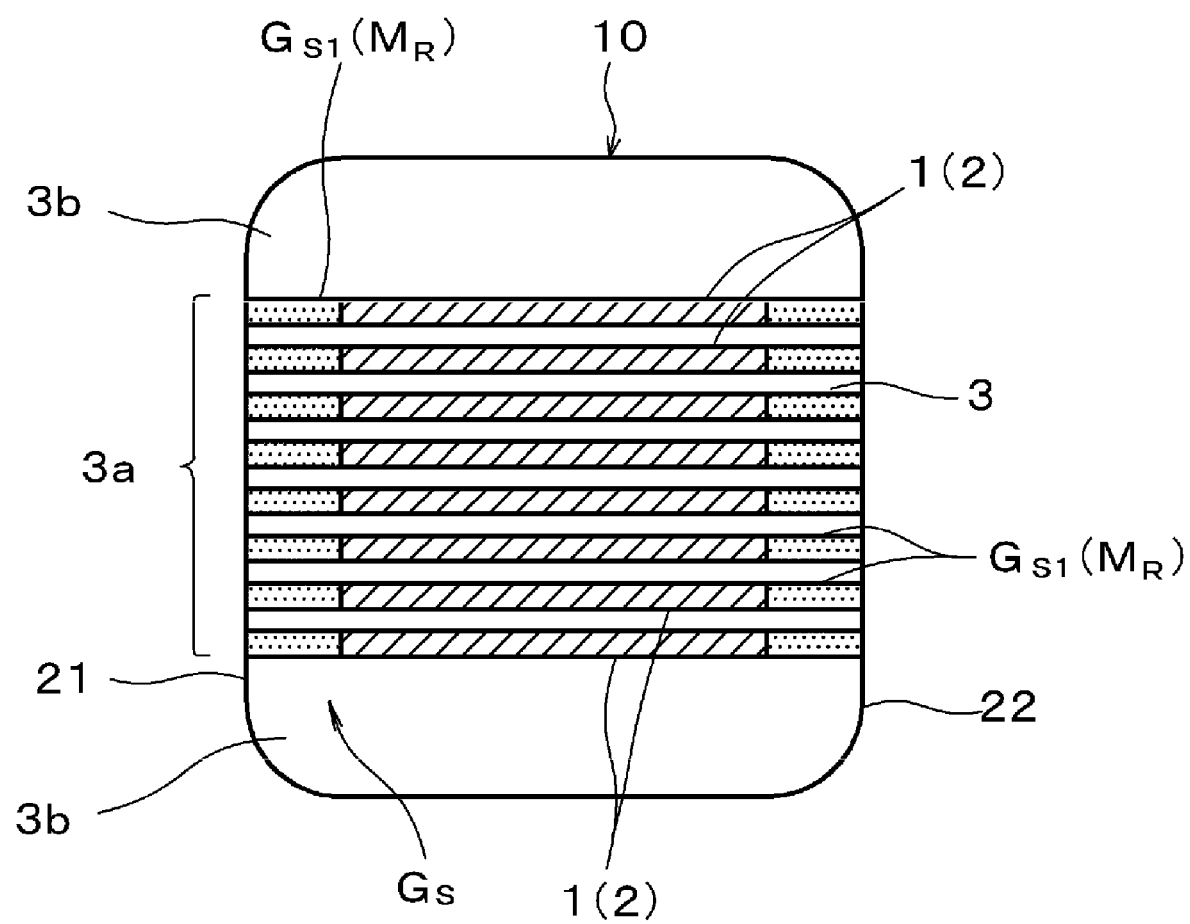
FIG. 3 is a cross-sectional view taken along line B-B in FIG. 1.
Figure 4:
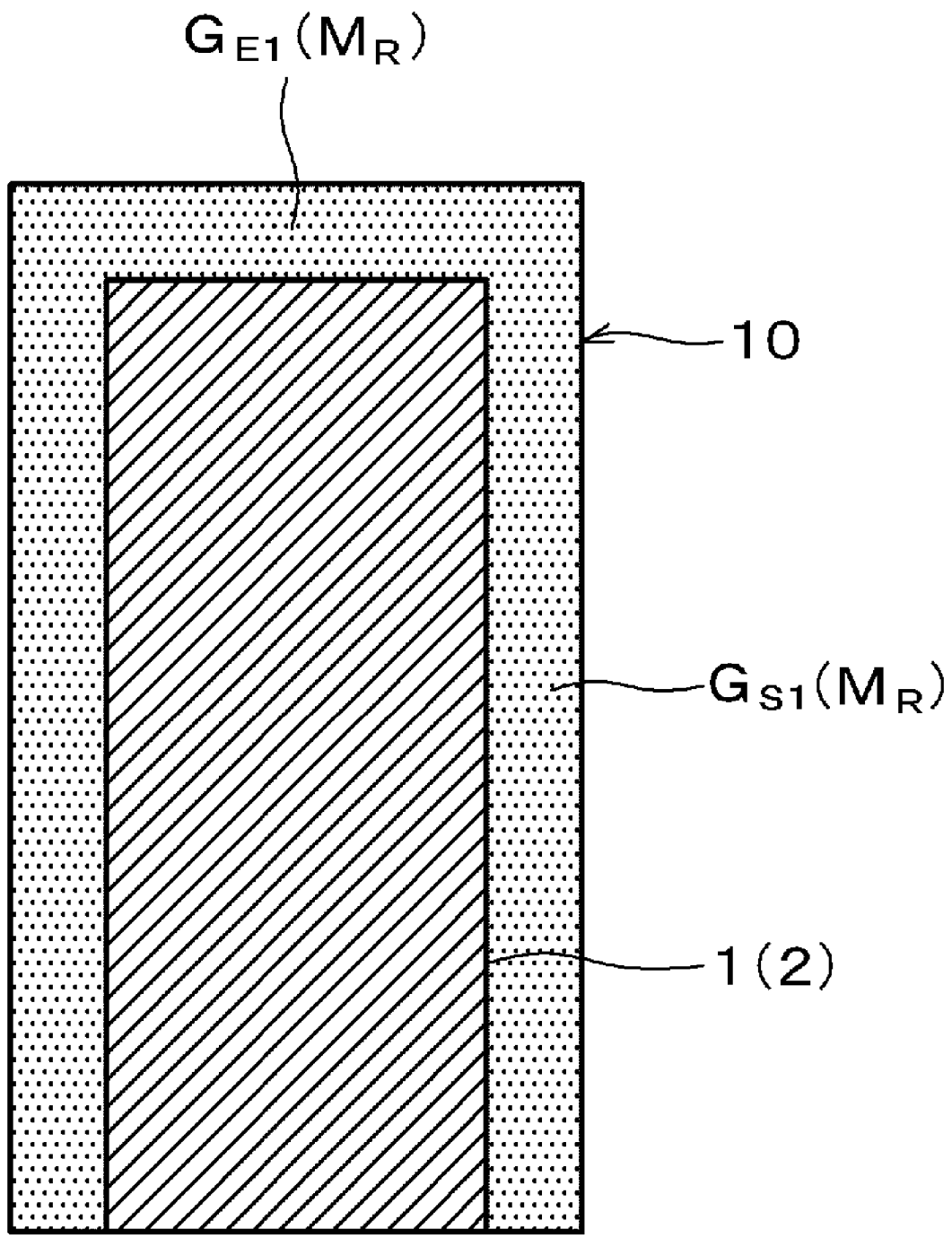
FIG. 4 is an explanatory drawing of the structure of the multi-layered ceramic capacitor according to the first preferred embodiment of the present invention.

FIG. 1 is a perspective view illustrating a multi-layered ceramic electronic component (in this preferred embodiment, a multi-layered ceramic capacitor) according to a preferred embodiment of the present invention. FIG. 2 is a cross-sectional view taken along line A-A in FIG. 1. FIG. 3 is a cross-sectional view taken along line B-B in FIG. 1. FIG. 4 is an explanatory drawing illustrating the structure of a multi-layered ceramic capacitor according to a first preferred embodiment of the present invention.

As shown in FIGS. 1 to 4, a multi-layered ceramic capacitor according to the first preferred embodiment includes a sintered ceramic body 10 in which a plurality of ceramic layers 3 are stacked, first internal electrodes 1 and second internal electrodes 2 alternately arranged in the sintered ceramic body, one end of each of the first internal electrodes 1 extending to a first end surface 11 of the sintered ceramic body 10, and one end of each of the second internal electrodes 2 extending to a second end surface 12 of the sintered ceramic body 10, where the first end surface 11 and the second end surface 12 are opposed to each other, and a first external terminal electrode 31 and a second external terminal electrode 32 arranged on the first end surface 11 and the second end surface 12, respectively, of the sintered ceramic body 10, the first external terminal electrode 31 and the second external terminal electrode 32 being connected to the ends of the first internal electrodes 1 and the ends of the second internal electrodes 2, respectively.

Specifically, the sintered ceramic body 10 has a first side surface 21 and a second side surface 22 opposed to the first side surface 21 (FIGS. 1 and 3), the first end surface 11 and the second end surface 12 opposed to the first end surface 12 (FIGS. 1 and 2). As shown in FIGS. 2 and 3, the first internal electrodes 1, which include Ni and which are connected to the first end surface 11, and the second internal electrodes 2, which include Ni and which are connected to the second end surface 12, are alternately arranged in the sintered ceramic body 10 such that two adjacent first and second internal electrodes 1 and 2 face each other with one of the ceramic layers 3 therebetween, thereby causing the ceramic layer 3 to function as a dielectric layer contributing to the generation of capacitance.

As shown in FIGS. 1 and 2, the first external terminal electrode 31 is provided on the first end surface 11 of the sintered ceramic body 10 and is electrically connected to the first internal electrodes 1. The second external terminal electrode 32 is provided on the second end surface 12 on the sintered ceramic body 10, and is electrically connected to the second internal electrodes 2. The first external terminal electrode 31 and the second external terminal electrode 32 are subjected to mutually different potentials.

In this multi-layered ceramic capacitor, as shown in FIGS. 3 and 4, the ceramic layers 3 of the sintered ceramic body 10 include an effective layer portion 3a sandwiched by the first internal electrodes 1 and the second internal electrodes 2 and contributing to the generation of capacitance, side gap portions $G_S$ between sides of the first and second internal electrodes 1 and 2 and the first and second side surfaces 21 and 22 of the sintered ceramic body 10 and between sides of the effective layer portion 3a and the first and second side surfaces 21 and 22 of the sintered ceramic body 10, and end gap portions $G_E$ between an end of the first internal electrode 1 and the second end surface 12 of the sintered ceramic body 10, between an end of the second internal electrode 2 and the first end surface 11 of the sintered ceramic body 10, and between ends of the effective layer portion 3a and the first and second end surfaces 11 and 12 of the sintered ceramic body 10.

As shown in FIG. 3, in the sintered ceramic body 10, the ceramic layers 3 further include external layers 3b disposed outside the uppermost internal electrode 1 (2) and the lowermost internal electrode 1 (2), and the external layers 3b do not contribute to the generation of capacitance.

In the side gap portions $G_S$ and the end gap portions $G_E$, regions $G_{S1}$ (FIGS. 3 and 4) and regions $G_{E1}$ (FIG. 4) adjacent to the first and second internal electrodes 1 and 2 have a Mg concentration greater than that of the effective layer portion 3a and are defined as Mg-rich regions $M_R$. In each of the regions $G_{S1}$ and $G_{E1}$, Mg is substantially uniformly distributed.

In the first preferred embodiment, Mg is substantially uniformly distributed across each of the regions $G_{S1}$ and $G_{E1}$. However, Mg distribution in each of the regions $G_{S1}$ and $G_{E1}$ is not necessarily uniform. However, Mg must be present in portions abutting on the internal electrodes. As in the first preferred embodiment, Mg may be distributed across each of the regions $G_{S1}$ and $G_{E1}$ so as to also be present at the side surfaces and the end surfaces of the sintered ceramic body. Alternatively, Mg may be unevenly distributed in each of the regions $G_{S1}$ and $G_{E1}$ so that Mg is present at least in portions abutting on the internal electrodes.

In the first preferred embodiment, as a ceramic material for the effective layer portion 3a, a material not including Mg (a primary material including no added Mg) is used. As a material for the Mg-rich regions $M_R$, a material having a Mg content which is achieved by adding about 0.5 mol to about 1 mol of Mg to about 100 mol of the ceramic material for the effective layer portion 3a (the primary material) is used.

Figure 5:
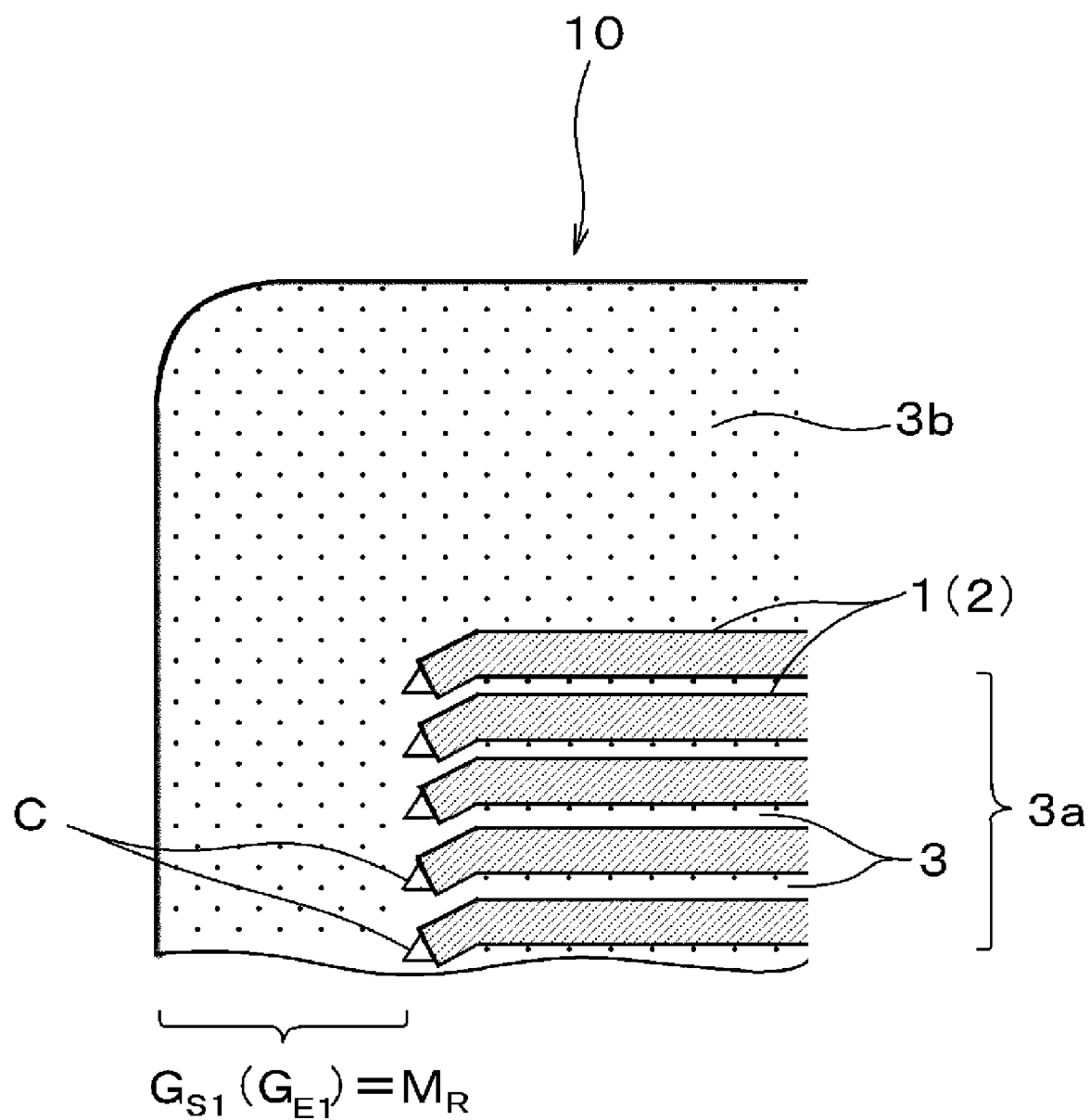
FIG. 5 is a fragmentary cross-sectional view illustrating the effect of the multi-layered ceramic capacitor according to the first preferred embodiment of the present invention.

In the multi-layered ceramic capacitor according to the first preferred embodiment, in the side gap portions $G_S$ and the end gap portions $G_E$, the regions $G_{S1}$ and $G_{E1}$ adjacent to the first and second internal electrodes 1 and 2 are provided as the Mg-rich regions $M_R$ having a Mg concentration greater than that of the effective layer portion 3a, as described above. Thus, an oxidized compound of Ni that is a metal included in the internal electrodes 1 and 2 and Mg that is a metal element included in the ceramic material is formed at interfaces between the first and second internal electrodes 1 and 2 and the regions $G_{S1}$ and $G_{E1}$. Clearance C (see FIG. 5) at the interfaces between the internal electrodes 1 and 2 and the regions $G_{S1}$ and $G_{E1}$ is filled with the resulting oxidized compound, and the internal electrodes 1 and 2 are bonded to the regions $G_{S1}$ and $G_{E1}$ with the oxidized compound. This results in significantly improved the moisture resistance, and even a small capacitor has highly reliable moisture resistance.

A method for producing the multi-layered ceramic capacitor will be described below.

(1) Ceramic green sheets each primarily including a dielectric ceramic material, a conductive paste for internal electrodes, the paste including Ni powder as a conductive material, and a conductive paste for external terminal electrodes are prepared.

The ceramic green sheets and the conductive pastes each include a binder and a solvent. Known organic binders and organic solvents may be used.

Figure 6A:
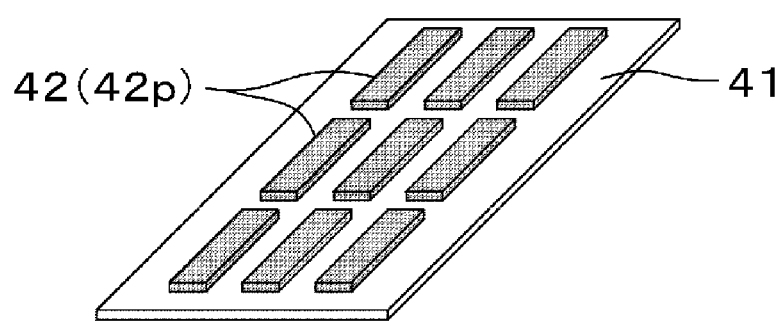
FIGS. 6A, 6B, and 6C illustrate a method of producing the multi-layered ceramic capacitor according to the first preferred embodiment of the present invention.

(2) As shown in FIG. 6A, the conductive paste 42 for internal electrodes is applied to a ceramic green sheet 41 by, for example, screen printing so as to form an internal electrode pattern 42p.

Figure 6B:
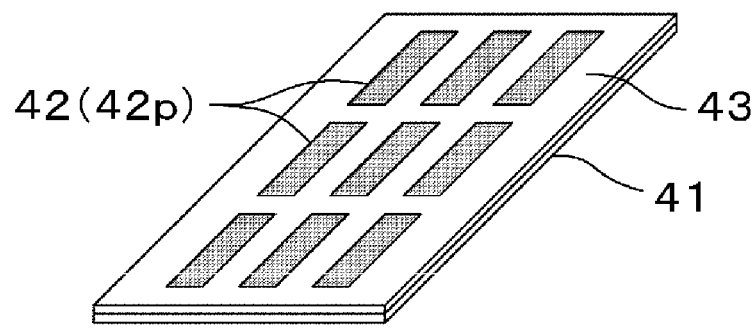

(3) As shown in FIG. 6B, a ceramic paste 43 is applied to a portion of the ceramic green sheet 41 on which the internal electrode pattern 42p is not arranged, whereby the regions $G_{S1}$ and $G_{E1}$ are printed.

The ceramic paste includes a ceramic material having a Mg concentration greater than that of the ceramic material of the underlying ceramic green sheet 41.

In order to distribute Mg unevenly in each of the regions $G_{S1}$ and $G_{E1}$, for example, a plurality of types of ceramic pastes having different Mg concentrations are prepared and then adjacently applied, in sequence, in the regions $G_{S1}$ and $G_{E1}$ by printing.

(4) Next, the ceramic green sheets 41 shown in FIG. 6B are stacked so as to be alternately displaced in a lengthwise direction by a predetermined distance, thereby forming a mother block. Green sheets with no internal electrode patterns are stacked as the external layers.

The mother block is press-bonded in the stacking direction by isostatic pressing, if necessary.

Figure 6C:
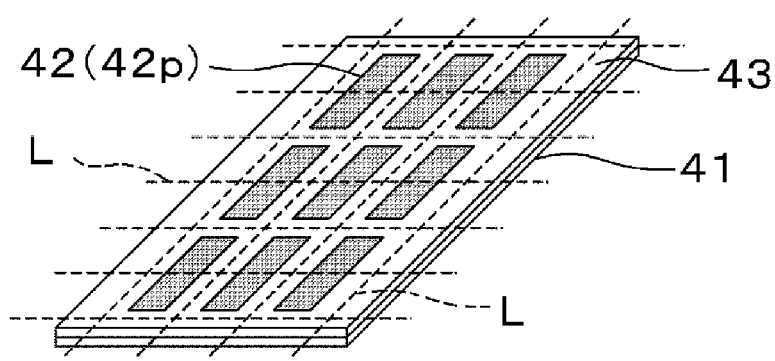

(5) The mother block is cut along predetermined cutting lines L into green chips having a predetermined size (see FIG. 6C). For the sake of convenience, FIG. 6C illustrates the cutting lines L of one of the ceramic green sheets. The green chips may be polished by barrel polishing to round off edges and vertices of the chips, if necessary.

(6) The green chips (green ceramic laminates) are fired. The firing temperature is preferably in the range of about 900° C. to about 1,300° C. The firing atmosphere is appropriately selected from air, $N_2$ and other suitable atmosphere.

(7) The conductive paste for external terminal electrodes is applied to both ends of each of the fired ceramic laminates and is baked to be formed into external terminal electrodes. The baking temperature is preferably in the range of about 700° C. to about 900° C. The baking atmosphere is appropriately selected from air, $N_2$ and other suitable atmosphere.

Plating films are formed on surfaces of the external terminal electrodes, if necessary, in order to improve the reliability of the electrical connections and solderability.

Thereby, a multi-layered ceramic capacitor as shown in FIGS. 1 to 4 is obtained.

In the multi-layered ceramic capacitor according to the first preferred embodiment, the ceramic paste for the regions $G_{S1}$ and $G_{E1}$ is a material having a Mg concentration greater than that of a material of the ceramic green sheets 1. Thus, as shown in FIGS. 3 and 4, the Mg concentration in the regions of the side gap portions $G_S$ and the end gap portions $G_E$ on the same levels with the first and second internal electrodes 1 and 2 is greater than those of other ceramic portions (e.g., effective layer portion 3a). The clearance C (see FIG. 5) at the interfaces between the internal electrodes 1 and 2 and the regions $G_{S1}$ and $G_{E1}$ is filled with the oxidized compound of Mg and Ni, which defines the first and second internal electrodes 1 and 2, and the internal electrodes 1 and 2 are bonded to the regions $G_{S1}$ and $G_{E1}$ with the oxidized compound. This results in a multi-layered ceramic capacitor having outstanding moisture resistance.

Among the ceramic layers, the constituents thereof may diffuse to some degree. Therefore, regions which are not formed as the Mg-rich regions may have slightly higher Mg concentrations if they located among the Mg-rich regions $M_R$, i.e., among the regions $G_{S1}$ or among the regions $G_{E1}$.

Mg in the ceramic material may be present in the form of, for example, MgO or in the forms of other Mg oxides and other Mg compounds. However, it is not desirable for the Mg to present in a ceramic material as a glass component. The reason for this is as follows. As the glass content of the side gap portions $G_S$ and the end gap portions $G_E$ is increased, the sintering temperature of the side gap portions $G_S$ and the end gap portions $G_E$ is reduced. The side gap portions $G_S$ and the end gap portions $G_E$ are located near the outer surface of the chip, and heat is easily conducted to these portions $G_S$ and $G_E$. Therefore, if the glass content in the side gap portions $G_S$ and the end gap portions $G_E$ is increased, the side gap portions $G_S$ and the end gap portions $G_E$ may be excessively sintered, thereby causing structural defects and a reduction in the strength of the main body of the capacitor.

Specifically, the Mg concentration of the ceramic material for the Mg-rich regions $M_R$ is preferably achieved by adding about 0.5 mol to about 1.0 mol of Mg to about 100 mol of the primary material (the ceramic material for the effective layer portion 3a).

With respect to the structure of various preferred embodiments of the present invention, the Mg concentration in the entire ceramic material defining the main body of the capacitor may be increased. However, a change in the composition of the effective layer portion may not achieve desired capacitor characteristics (e.g., dielectric constant, temperature characteristics). Therefore, it is preferable that the side gap portions $G_S$ and the end gap portions $G_E$ have a greater Mg concentration, as described above.

In the multi-layered ceramic electronic component according to preferred embodiments of the present invention, the ceramic layers may be composed of a dielectric ceramic material including, for example, $BaTiO_3$, $CaTiO_3$, $SrTiO_3$, or $CaZrO_3$ as a main component. The dielectric ceramic material may further include a secondary component, for example, a Mn compound, an Fe compound, a Cr compound, a Co compound, or a Ni compound.

In the multi-layered ceramic electronic component according to preferred embodiments of the present invention, each of the ceramic layers preferably has a thickness of about 1 μm to about 10 μm, for example.

The internal electrodes must include Ni. Specifically, the internal electrodes must include metallic Ni, a Ni compound such as NiO, or a Ni alloy. Each of the internal electrodes preferably has a thickness of about 1 μm to about 10 μm, for example.

Each of the external terminal electrodes preferably has a multi-layered structure including an underlying electrode and a plating layer provided thereon. The external terminal electrodes are usually arranged so as to cover the end surfaces and to extend to the main surfaces and to the side surfaces. However, the external terminal electrodes may be arranged at least on the end surfaces.

The underlying electrodes of the external terminal electrodes may be composed of a metal such as Cu, Ni, Ag, or Ag—Pd, for example. The underlying electrodes preferably include glass.

When the multi-layered ceramic electronic component is to be solder-mounted, each of the plating layers of the external terminal electrodes preferably has a two-layer structure including a Ni plating sublayer and a Sn plating sublayer. When the multi-layered ceramic electronic component is to be mounted with a conductive adhesive or wire bonding, each of the plating layers preferably has a two-layer structure including a Ni plating sublayer and an Au plating sublayer. When the capacitor is to be embedded in a resin substrate, the outermost sublayer of each plating layer is preferably a Cu plating sublayer. Each of the plating layers does not necessarily include two sublayers but may include a single sublayer or three or more sublayers. Each of the sublayers preferably has a thickness of about 1 μm to about 10 μm, for example. Furthermore, a resin layer providing stress relaxation may be arranged between each of the underlying electrodes and the corresponding plating layer.

Preferred embodiments of the present invention focus on the reaction between Ni in the internal electrodes and Mg in the ceramic material. Thus, the present invention is applicable not only to laminated ceramic capacitors but also to multi-layered thermistors, multi-layered inductors and other suitable devices, as long as they can be made into the characteristic structure according to preferred embodiments of the present invention and are expected to achieve the advantages and effects of the present invention.

Second Preferred Embodiment

Figure 7:
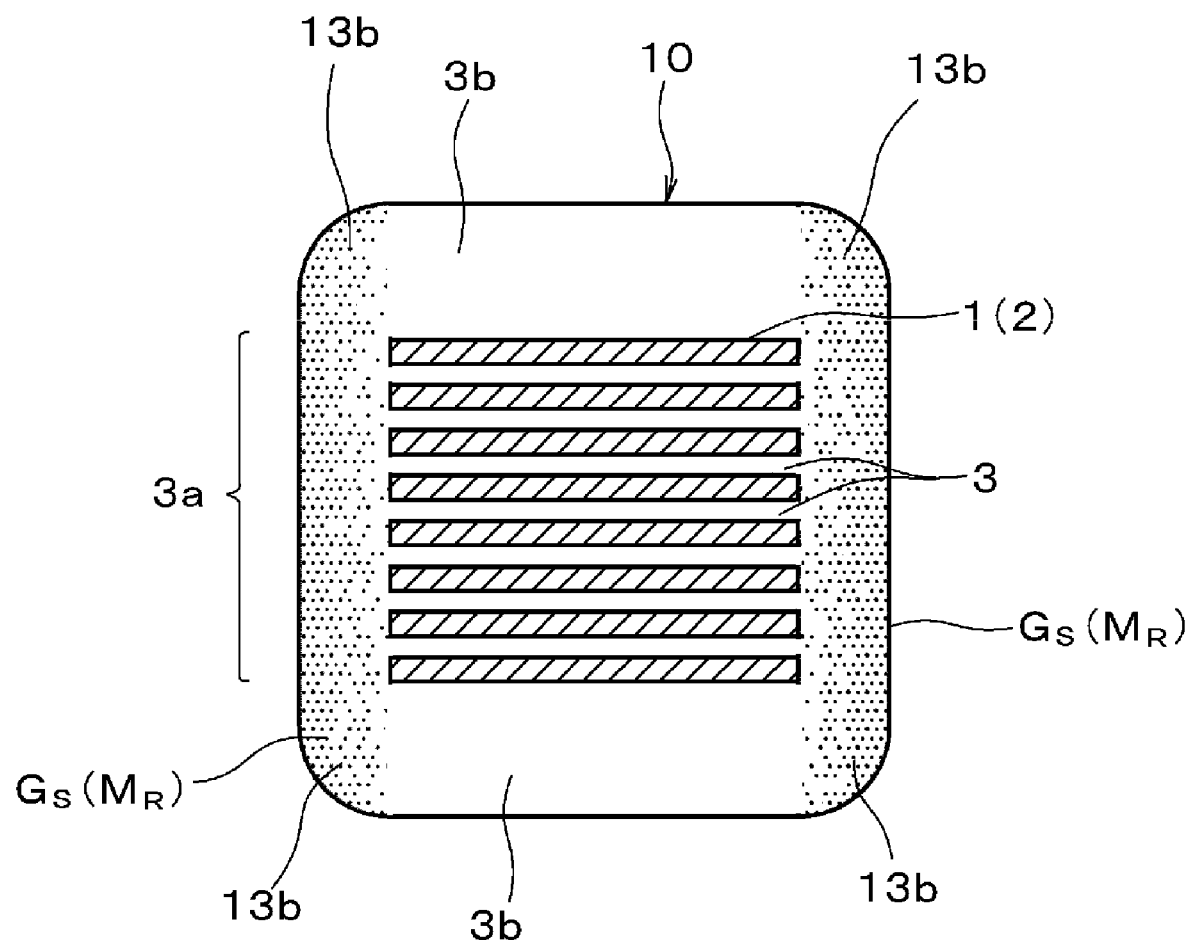
FIG. 7 is a cross-sectional view illustrating the structure of a multi-layered ceramic capacitor according to a second preferred embodiment of the present invention.
Figure 8:
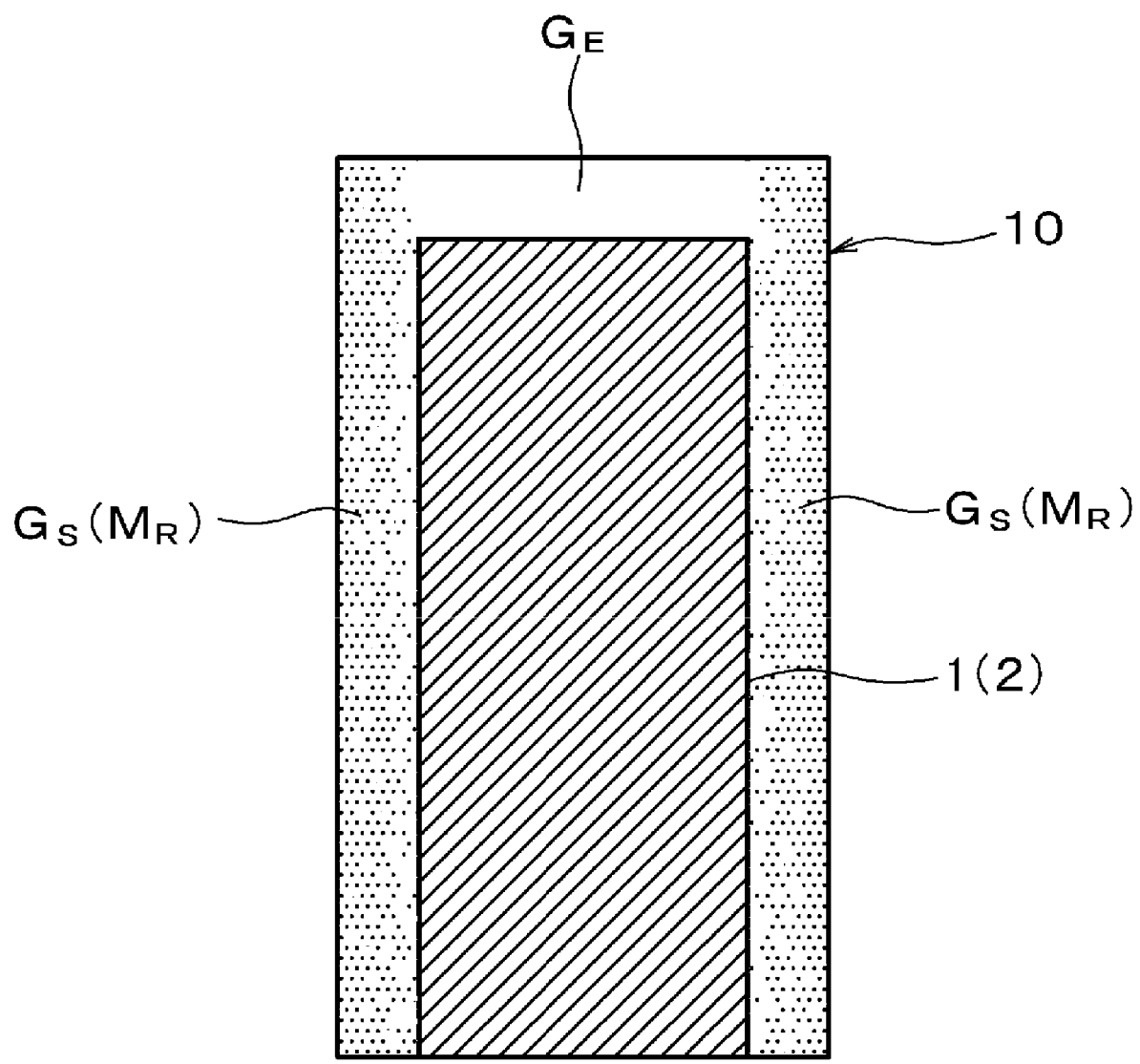
FIG. 8 illustrates the structure of the multi-layered ceramic capacitor according to the second preferred embodiment of the present invention.

FIG. 7 is a fragmentary cross-sectional view of a multi-layered ceramic electronic component (in this preferred embodiment, a multi-layered ceramic capacitor) according to another preferred embodiment of the present invention. FIG. 7 is a view taken along line B-B in FIG. 1 according to the first preferred embodiment. FIG. 8 is an explanatory drawing of a multi-layered ceramic capacitor according to the second preferred embodiment of the present invention.

In the multi-layered ceramic capacitor according to the second preferred embodiment as shown in FIGS. 7 and 8, the side gap portions $G_S$ are Mg-rich regions $M_R$, and side gap vertical extensions 13b that vertically extend from the side gap portions $G_S$, in the ceramic layers located outside the outermost internal electrodes (the external layers 3b) are also Mg-rich regions $M_R$.

In the multi-layered ceramic capacitor according to the second preferred embodiment, each of the Mg-rich regions $M_R$ has a concentration gradient such that Mg concentration is less as the distance from the outside toward the inside of the sintered ceramic body is increasing.

That is, the multi-layered ceramic capacitor according to the second preferred embodiment differs from that according to the first preferred embodiment in that the side gap vertical extensions 13 that vertically extend from the side gap portions $G_S$, of the ceramic layers located outside the outermost internal electrodes (of the external layers 3b) are also Mg-rich regions $M_R$, no Mg-rich region is provided in the end gap portions $G_E$, and each of the Mg-rich regions $M_R$ has a concentration gradient such that Mg concentration is less as the distance from the outside toward the inside of the sintered ceramic body is increasing.

The remaining structure is substantially the same as that of the first preferred embodiment.

In the structure according to the second preferred embodiment, the side gap portions $G_S$ and the side gap vertical extensions 13b are Mg-rich regions $M_R$. Thereby, clearance at the interfaces between the sides of the internal electrodes and the ceramic layers is filled with an oxidized compound of Ni and Mg, and the sides of the internal electrodes are securely bonded to the ceramic layers with the oxidized compound of Ni and Mg. This results in a significantly improved moisture resistance, and even a small capacitor has highly reliable moisture resistance, as in the first preferred embodiment.

A method for producing the multi-layered ceramic capacitor will be described below.

In the production of the multi-layered ceramic capacitor according to the second preferred embodiment, in the step corresponding to the step (3) in the method of producing the multi-layered ceramic capacitor according to the first preferred embodiment, a ceramic paste including the same material as that of a ceramic green sheet defining a base is applied onto the ceramic green sheet in a portion around an internal electrode pattern (portion in which the internal electrode pattern is not arranged).

As in the first preferred embodiment, the resulting ceramic green sheets are stacked so as to be alternately displaced in a lengthwise direction by a predetermined distance, thereby forming a mother block. Green sheets with no internal electrode pattern are stacked as the external layers.

The mother block is press-bonded in the stacking direction by isostatic pressing, if necessary.

The mother block is cut along predetermined cutting lines L into green chips having a predetermined size, as in the first preferred embodiment. The green chips may be polished by barrel polishing to round off edges and vertices of the chips, if necessary.

Both of the side surfaces of each of the resulting green chips are dipped in an organic binder solution including MgO at about 1 mol/L to impregnate the green chips with Mg, followed by drying.

Thereafter, as in the first preferred embodiment, the green chips are fired, and then external terminal electrodes are formed. What is obtained by the processes above is a multi-layered ceramic capacitor in which each of the Mg-rich regions $M_R$ in a sintered ceramic body 10 has a Mg concentration gradient such that Mg concentration is less as the distance from the outside toward the inside of the sintered ceramic body 10 increases, as shown by the fragmentary drawings of FIGS. 7 and 8.

In the second preferred embodiment, the side surfaces of each green chip are dipped in the organic binder solution including MgO. However, each green chip may be entirely dipped in the organic binder solution including MgO.

Third Preferred Embodiment

Figure 9:
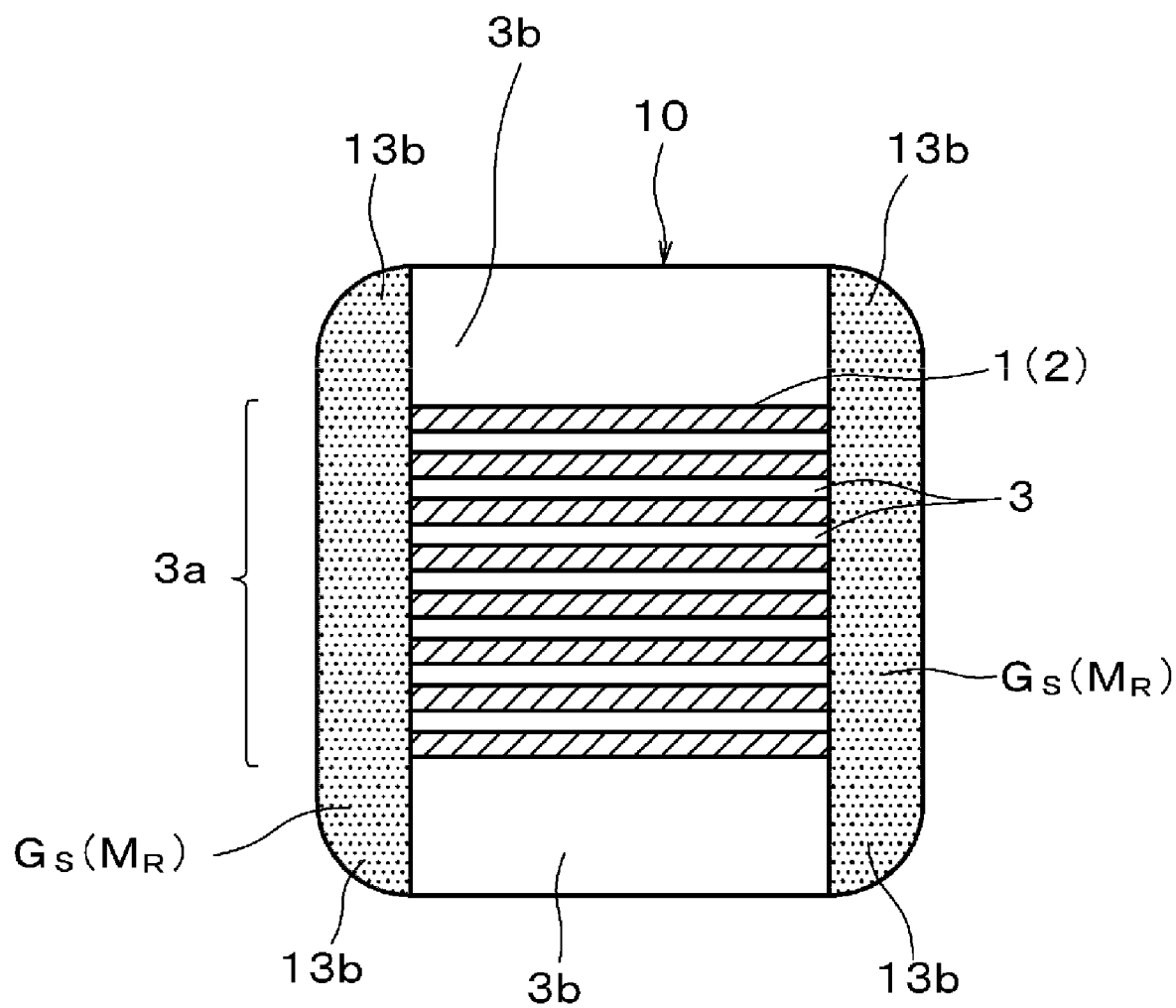
FIG. 9 is a cross-sectional view illustrating the structure of a multi-layered ceramic capacitor according to a third preferred embodiment of the present invention.
Figure 10:
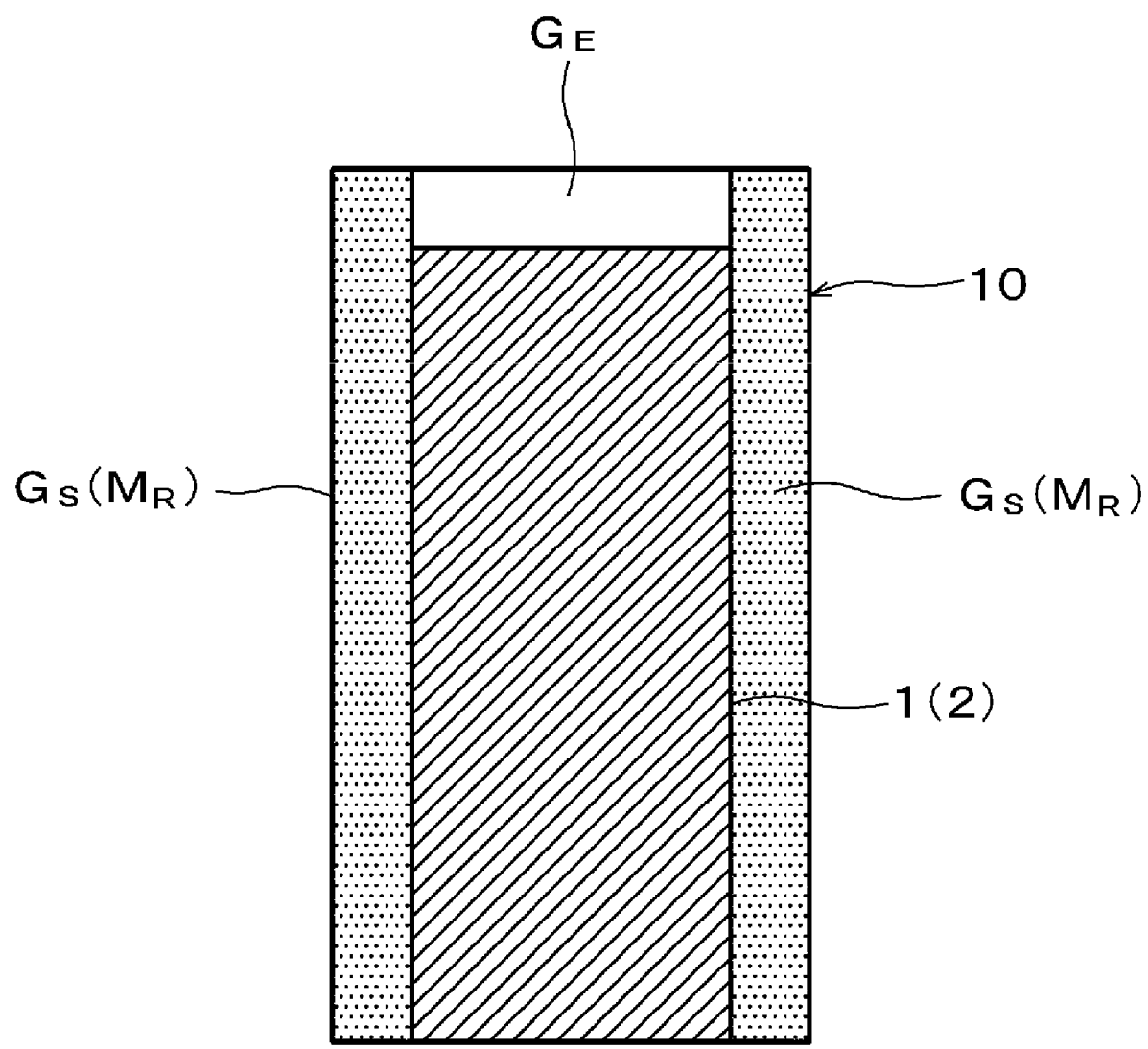
FIG. 10 illustrates the structure of the multi-layered ceramic capacitor according to the third preferred embodiment of the present invention.

FIG. 9 is a fragmentary cross-sectional view of a multi-layered ceramic electronic component (in this preferred embodiment, a multi-layered ceramic capacitor) according to another preferred embodiment of the present invention. FIG. 9 is a view taken along line B-B in FIG. 1 according to the first preferred embodiment. FIG. 10 is an explanatory drawing of a multi-layered ceramic capacitor according to the third preferred embodiment of the present invention.

In the multi-layered ceramic capacitor according to the third preferred embodiment as shown in FIGS. 9 and 10, the side gap portions $G_S$ are Mg-rich regions $M_R$, and side gap vertical extensions 13b that vertically extend from the side gap portions $G_S$, in the ceramic layers located outside the outermost internal electrodes (the external layers 3b) are also Mg-rich regions $M_R$.

As shown in FIG. 10, no Mg-rich region is formed in the end gap portions $G_E$.

The multi-layered ceramic capacitor according to the third preferred embodiment differs from that according to the first preferred embodiment in that the side gap vertical extensions 13b that vertically extends from the side gap portions $G_S$, in the ceramic layers located outside the outermost internal electrodes (the external layers 3b) are also Mg-rich regions $M_R$, and no Mg-rich region is formed in the end gap portions $G_E$.

The remaining structure is substantially the same as that of the first preferred embodiment. In the third preferred embodiment, Mg is substantially uniformly distributed across the entire gap portions $G_S$ and the side gap vertical extensions 13b. However, Mg may not necessarily be uniformly distributed across the entire gap portions $G_S$ and the side gap vertical extensions 13b. However, Mg must be present in the side gap portions $G_S$ and the side gap vertical extensions 13b near the internal electrodes. As in the third preferred embodiment, Mg may be distributed across the entire side gap portions $G_S$ and the side gap vertical extensions 13b so as to also be present at the side surfaces of the sintered ceramic body. Alternatively, Mg may be unevenly distributed so as to be present in the side gap portions $G_S$ and the side gap vertical extensions 13b near the internal electrodes.

The structure according to the third preferred embodiment also results in improved moisture resistance, and even a small capacitor has highly reliable moisture resistance.

A method for producing the multi-layered ceramic capacitor will be described below.

Figure 11A:
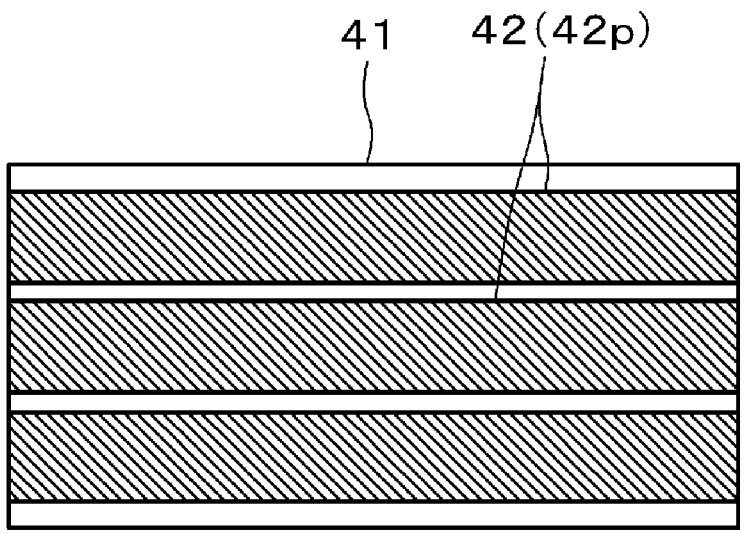
FIGS. 11A and 11B illustrate a method for producing the multi-layered ceramic capacitor according to the third preferred embodiment of the present invention.

As shown in FIG. 11A, the conductive paste 42 is applied by, for example, screen printing onto the ceramic green sheet 41 such that an internal electrode pattern 42p defined by strips is formed.

The ceramic green sheets 41 shown in FIG. 11A are stacked so as to be alternately displaced in a widthwise direction by a predetermined distance, thereby forming a mother block. Green sheets with no internal electrode pattern are stacked as the external layers.

The mother block is press-bonded in the stacking direction by isostatic pressing, if necessary.

Figure 11B:
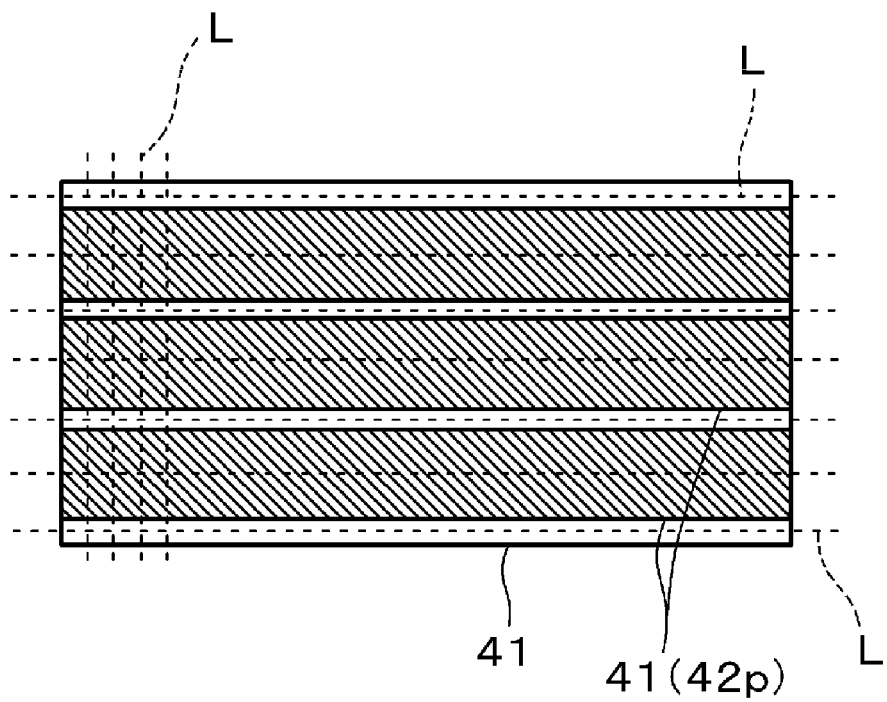

The mother block is cut along predetermined cutting lines L into green chips having a predetermined size (see FIG. 11B. For the sake of convenience, FIG. 11B illustrates the cutting lines L of one of the ceramic green sheets.

Each of the resulting green chips differs from those in the first and second preferred embodiments in that the internal electrode patterns are exposed on both side surfaces as well as the end surfaces of the green chip.

A ceramic paste having a Mg concentration greater than the ceramic material of the ceramic green sheets is applied onto both side surfaces of each green chip so as to have a predetermined thickness and then dried.

In order to distribute Mg unevenly in the side gap portions $G_S$ and the side gap vertical extensions 13b, for example, a plurality of types of ceramic pastes having different Mg concentrations are prepared and the different types of ceramic pastes are applied and dried in sequence.

Thereby, the side gap portions $G_S$ are formed as Mg-rich regions (see FIG. 9).

In this case, the side gap vertical extensions 13b that vertically extend from the side gap portions $G_S$ in the ceramic layers located outside of the outermost internal electrodes are also formed as Mg-rich regions.

The green chips may be polished by barrel polishing to round off edges and vertices of the chips, if necessary. When the Mg-rich regions are formed by dipping the side surfaces of each green chip in a ceramic paste bath, round edges and vertices of each green chip may be obtained, and in this case, the need for barrel polishing is eliminated.

Other steps are preferably the same as in the first preferred embodiment.

EXAMPLES

Example 1

Substantially rectangular ceramic green sheets each having a thickness of about 2.0 μm were formed of a ceramic slurry primarily including a barium-titanate-based reduction-resistant ceramic powder. As the barium titanate-based reduction-resistant ceramic powder, i.e., as a ceramic material for an effective layer portion, in Example 1, a MgO-free material including $BaTiO_3$ and $Y_2O_3$ at a ratio of about 99 mol to about 1 mol was used.

A conductive paste for internal electrodes was applied by screen printing onto each of the ceramic green sheets so as to be formed into an internal electrode pattern having a short side width of about 800 μm. The conductive paste included a Ni powder having an average particle diameter of about 0.3 μm and an organic binder at a ratio of about 100:3.0 by weight.

A ceramic paste was applied on the ceramic green sheet around the internal electrode pattern so as to even out the level differences between the internal electrode pattern and the ceramic green sheet around the internal electrode pattern. The ceramic paste included a ceramic material and an organic binder at a ratio of about 100:3.0 by weight, and the ceramic material included $BaTiO_3$, $Y_2O_3$ and MgO at a ratio of about 99 mol:1 mol:0.5 mol. (The ceramic material was for gap portions, and the ceramic material for gap portions had a MgO content which is achieved by adding about 0.5 mol of MgO to about 100 mol of the foregoing MgO-free ceramic material for the effective layer portion.)

Next, 240 ceramic green sheets with the conductive paste and the ceramic paste printed thereon were prepared in the above-described manner, and these 240 ceramic green sheets were stacked. Then, 70 ceramic green sheets with no electrode pattern thereon (ceramic green sheets for external layers) were stacked on each of the top and bottom of the stack of 240 ceramic green sheets, press-bonded in the thickness direction and cut into green chips (unsintered ceramic bodies) each having a length of about 2.0 mm, a width of about 1.0 mm and a thickness of about 1.0 mm.

The green chips were fired at about 1,300° C. to form sintered ceramic bodies each having a length of about 1.6 mm, a width of about 0.8 mm and a thickness of about 0.8 mm.

A conductive paste was applied to both end surfaces, at which the internal electrodes were exposed, of each of the sintered ceramic bodies and then baked to produce external terminal electrodes. Thus, multi-layered ceramic capacitors A (sample A) were obtained.

Multi-layered ceramic capacitors B (sample B) were fabricated in the same manner as the multi-layered ceramic capacitors A, except that a ceramic material which was prepared by adding about 0.75 mol of MgO to about 100 mol of the primary material including about 99 mol of $BaTiO_3$ and about 1 mol of $Y_2O_3$ was used as the ceramic material for the gap portions. The ceramic material for the gap portions had a MgO content which is achieved by adding about 0.75 mol of MgO to about 100 mol of the foregoing MgO-free ceramic material for the effective layer portion.

Multi-layered ceramic capacitors C (sample C) were fabricated in the same manner as the multi-layered ceramic capacitors A, except that a ceramic material which was prepared by adding about 1 mol of MgO to about 100 mol of a main component including about 99 mol of $BaTiO_3$ and about 1 mol of $Y_2O_3$ was used as the ceramic material for the gap portions. The ceramic material for the gap portions had a MgO content which is achieved by adding about 1 mol of MgO to about 100 mol of the foregoing MgO-free ceramic material for the effective layer portion.

Multi-layered ceramic capacitors D (sample D) were fabricated in the same manner as the multi-layered ceramic capacitors A, except that a ceramic material which was prepared by adding about 1.5 mol of MgO to a main component including about 99 mol of $BaTiO_3$ and about 1 mol of $Y_2O_3$ was used as the ceramic material for the gap portions. The ceramic material for the gap portions had a MgO content which is achieved by adding about 1.5 mol of MgO to about 100 mol of the foregoing MgO-free ceramic material for the effective layer portion.

For comparison purposes, as Comparative Example 1, multi-layered ceramic capacitors E (sample E) were fabricated in the same manner, except that a MgO-free ceramic paste including the ceramic powder which was the material of the ceramic green sheets was applied around the internal electrode pattern by screen printing.

As a test, about 0.5V DC was applied to the multi-layered ceramic capacitors according to Example 1 (samples A, B, C and D) and the multi-layered ceramic capacitors according to Comparative Example 1 (sample E). The multi-layered ceramic capacitors were separated into defective products having an electrical resistance equal to or less than about $1.0 \times 10E6\Omega$ and non-defective products having an electrical resistance greater than about $1.0 \times 10E6\Omega$.

Thereafter, the multi-layered capacitors which were judged to be non-defective products were subjected to a damp heat test to check the moisture resistance.

The test conditions were as follows: temperature: about 125° C., humidity: about 95% RH, applied voltage: about 5 V DC, and holding time: about 144 hours. After the test, when about 10 V DC was applied at room temperature, samples having a resistance equal to or less than $1.0 \times 10E6\Omega$ were determined to have poor moisture resistance.

Table 1 shows the fraction of defective products before the damp heat test and the fraction of defective products after the damp heat test. The fraction of defective products before the damp heat test was the result of screening 500 specimens of each of the samples A, B, C and D according to Example 1 and the sample E according to Comparative Example 1. The heat damp test was performed on 100 specimens of each of these samples which had been judged to be non-defective products as the result of screening, and the fraction of defective products was obtained after the damp heat test.

TABLE 1

|  | MgO content (mol) | Fraction defective before damp heat test | Fraction defective after damp heat test |
| --- | --- | --- | --- |
| Sample A (Example) | 0.5 | 0.40% | 5% |
| Sample B (Example) | 0.75 | 0.60% | 0% |
| Sample C (Example) | 1 | 0.60% | 0% |
| Sample D (Example) | 1.5 | 0.40% | 15% |
| Sample E (Comparative Example) | 0 | 0.40% | 72% |

As shown in Table 1, the fraction of defective products before the damp heat test of the multi-layered ceramic capacitors (samples) A, B, C and D according to Example 1 were comparable to that of the multi-layered ceramic capacitors (sample) E according to Comparative Example 1. However, the fraction of defective products after the damp heat test of the multi-layered ceramic capacitors (samples) A, B, C and D according to Example 1 were significantly less than that of the multi-layered ceramic capacitors (sample) E according to Comparative Example 1. In particular, the fraction of defective products after the damp heat test of the samples B and C were 0%.

Many of the specimens of sample E according to Comparative Example 1 determined to be non-defective products after the damp heat test had lower resistance values after the test as compared to those before the test.

In samples B and C according to Example 1, no clearance was observed at the ends of the internal electrodes. In samples A and D, only small clearances were observed at the ends of the internal electrodes located in the middle portion in the stacking direction. Thus, it was speculated that in the multi-layered ceramic capacitors according to Example 1, the penetration of water into the clearance between the ends of the internal electrodes and the ceramic portions around the internal electrodes was inhibited, thereby suppressing the occurrence of defective products after the damp heat test.

Example 2

Substantially rectangular ceramic green sheets each having a thickness of about 2.0 μm were formed with a ceramic slurry primarily including a barium-titanate-based reduction-resistant ceramic powder. As the barium-titanate-based reduction-resistant ceramic powder, specifically, a MgO-free material including $BaTiO_3$ and $Y_2O_3$ at a ratio of about 99 mol:1 mol was used.

A conductive paste for internal electrodes was applied by screen printing onto each of the ceramic green sheets so as to be formed into an internal electrode pattern having a short side width of about 800 μm. The conductive paste included a Ni powder having an average particle diameter of about 0.3 μm and an organic binder at a ratio of about 100:3.0 by weight.

A ceramic paste was prepared by mixing the MgO-free ceramic powder included in the ceramic slurry used for forming the ceramic green sheets with an organic binder at a ratio of about 10:3.0 by weight. The ceramic paste was applied around the internal electrode pattern so as to even out the level differences between the internal electrode pattern and the ceramic green sheet around the internal electrode pattern.

Next, 240 ceramic green sheets with the conductive paste and the ceramic paste printed thereon were stacked. Then, 70 ceramic green sheets with no electrode pattern (ceramic green sheets for external layers) were stacked on each of the top and bottom of the stack of 240 ceramic green sheets, press-bonded in the thickness direction and cut into green chips (unsintered ceramic bodies) each having a length of about 2.0 mm, a width of about 1.0 mm and a thickness of about 1.0 mm.

One side surface of each of the green chips was dipped in an organic binder solution including MgO at about 1 mol/L and dried. Subsequently, the other side surface was also dipped therein to impregnate the green chips with Mg.

After drying the green chips, the green chips were fired at about 1,300° C. to form sintered ceramic bodies each having a length of about 1.6 mm, a width of about 0.8 mm and a thickness of about 0.8 mm.

A conductive paste was applied to both end surfaces, at which the internal electrodes were exposed, of each of the sintered ceramic bodies and then baked to turn into external terminal electrodes. Thus, multi-layered ceramic capacitors F (sample F) were obtained.

The multi-layered ceramic capacitors F (sample F) had the structure described in the second preferred embodiment. That is, in each of the multi-layered ceramic capacitors, Mg-rich regions were provided near the side surfaces, and each of the Mg-rich regions has a concentration gradient such that Mg concentration is less as the distance from the outside toward the inside of the sintered ceramic body increases (see FIGS. 7 and 8).

Furthermore, multi-layered ceramic capacitors G (sample G) were fabricated as in the same manner, except that the side surfaces were dipped in an organic binder solution including MgO at about 3.0 mol/L.

For comparison purposes, as Comparative Example 2, multi-layered ceramic capacitors H (sample H) were fabricated in the same manner as Comparative Example 1 described in connection with Example 1. Sample H according to Comparative Example 2 was produced in the same method as in Comparative Example 1 but differed in production lot from that in Comparative Example 1.

The multi-layered ceramic capacitors (samples) F and G according to Example 2 and the multi-layered ceramic capacitors H according to Comparative Example 2 were subjected to screening before a damp heat test, and specimens determined as non-defective products after screening were subjected to the damp heat test in the same manner as in Example 1 described above.

Table 2 shows the results.

TABLE 2

|  | Production conditions | Fraction defective before damp heat test | Fraction defective after damp heat test |
| --- | --- | --- | --- |
| Sample F (Example) | Dipping specimen in organic binder solution containing MgO at 1 mol/L | 0.20% | 6% |
| Sample G (Example) | Dipping specimens in organic binder solution containing MgO at 3 mol/L | 0.60% | 0% |
| Sample H (Comparative Example) | Without dipping specimens in organic binder solution of MgO | 0.60% | 69% |

As shown in Table 2, the results of the experiment with the multi-layered ceramic capacitors F and G according to Example 2 and the multi-layered ceramic capacitors H according to Comparative Example 2 are similar to those of the experiment with the samples according to Example 1 and Comparative Example 1.

That is, as shown in Table 2, the fraction of defective products before the damp heat test of the multi-layered ceramic capacitors F and G according to Example 2 were comparable to that of the multi-layered ceramic capacitors according to Comparative Example 2. However, the fraction of defective products after the damp heat test of the multi-layered ceramic capacitors F and G according to Example 2 were significantly less than that of the multi-layered ceramic capacitor according to Comparative Example 2. In particular, the fraction defective after the damp heat test of the sample G was 0%.

Many of the specimens of multi-layered ceramic capacitors H according to Comparative Example 2 determined to be non-defective products after the damp heat test had lower resistance values after the test compared with those before the test.

In the multi-layered ceramic capacitors G according to Example 2, no clearance was observed at ends of the internal electrodes. In the multi-layered ceramic capacitors F according to Example 2, only small clearances were observed at ends of the internal electrodes located in the middle portion in the stacking direction.

Example 3

Substantially rectangular ceramic green sheets each having a thickness of about 2.0 μm were formed of a ceramic slurry primarily including a barium-titanate-based reduction-resistant ceramic powder.

As the barium-titanate-based reduction-resistant ceramic powder, i.e., as a ceramic material for an effective layer portion, in Example 3, a material prepared by adding about 1 mol of MgO to about 100 mol of a primary material including about 99 mol of $BaTiO_3$ and about 1 mol of $Y_2O_3$ was used.

A conductive paste for internal electrodes was applied by screen printing onto each of the ceramic green sheets so as to be formed into an internal electrode pattern having a short side width of about 800 μm. The conductive paste included a Ni powder having an average particle diameter of about 0.3 μm and an organic binder at a ratio of about 100:3.0 by weight.

A ceramic paste was applied around the internal electrode pattern so as to even out the level differences between the internal electrode pattern and the ceramic green sheet around the internal electrode pattern. The ceramic paste included a ceramic material and an organic binder at a ratio of about 100:3.0 by weight, and the ceramic material was prepared by adding about 1.5 mol of MgO to about 100 mol of the primary material including about 99 mol of $BaTiO_3$ and about 1 mol of $Y_2O_3$. The ceramic material was for gap portions, and the amount of MgO added to about 100 mol of the primary material to prepare the ceramic material for gap portions was about 0.5 mol greater than the amount of MgO added to about 100 mol of the primary material to prepare the foregoing ceramic material for the effective layer portion.

Next, 240 ceramic green sheets with the conductive paste and the ceramic paste printed thereon were prepared in the above-described manner, and these 240 ceramic green sheets were stacked. Then, 70 ceramic green sheets with no electrode pattern thereon (ceramic green sheets for external layers) were stacked on each of the top and bottom of the stack of 240 ceramic green sheets, press-bonded in the thickness direction and cut into green chips (unsintered ceramic bodies) each having a length of about 2.0 mm, a width of about 1.0 mm and a thickness of about 1.0 mm.

The green chips were fired at about 1,300° C. to form sintered ceramic bodies each having a length of about 1.6 mm, a width of about 0.8 mm, and a thickness of about 0.8 mm.

A conductive paste was applied to both end surfaces, at which the internal electrodes were exposed, of each of the sintered ceramic bodies and then baked to turn into external terminal electrodes. Thus, multi-layered ceramic capacitors I (sample I) were obtained.

Multi-layered ceramic capacitors J (sample J) were fabricated in the same manner as those in fabricating the multi-layered ceramic capacitors I, except that a ceramic material prepared by adding about 1.75 mol of MgO to about 100 mol of the primary material including about 99 mol of $BaTiO_3$ and about 1 mol of $Y_2O_3$ was used as the ceramic material for the gap portions. The amount of MgO added to about 100 mol of the primary material to prepare the ceramic material for gap portions was about 0.75 mol greater than the amount of MgO added to 100 mol of the primary material to prepare the foregoing ceramic material for the effective layer portion.

Multi-layered ceramic capacitors K (sample K) were fabricated in the same manner as those in fabricating the multi-layered ceramic capacitors I, except that a ceramic material prepared by adding about 2 mol of MgO to about 100 mol of the primary material including about 99 mol of $BaTiO_3$ and about 1 mol of $Y_2O_3$ was used as the ceramic material for the gap portions. The amount of MgO added to about 100 mol of the primary material to prepare the ceramic material for gap portions was about 1 mol greater than the amount of MgO added to about 100 mol of the primary material to prepare the foregoing ceramic material for the effective layer portion.

Multi-layered ceramic capacitors L (sample L) were fabricated in the same manner as those in fabricating the multi-layered ceramic capacitors I, except that a ceramic material prepared by adding about 2.5 mol of MgO to about 100 mol of the primary material including about 99 mol of $BaTiO_3$ and about 1 mol of $Y_2O_3$ was used as the ceramic material for the gap portions. The amount of MgO added to about 100 mol of the primary material to prepare the ceramic material for gap portions was about 1.5 mol greater than the amount of MgO added to about 100 mol of the primary material to prepare the foregoing ceramic material for the effective layer portion.

For comparison purposes, multi-layered ceramic capacitors M (sample M) were fabricated in the same manner as those in fabricating the multi-layered ceramic capacitors I, except that a ceramic material including $BaTiO_3$, $Y_2O_3$ and MgO at a ratio of about 99 mol:1 mol:1 mol was used as the ceramic material for the gap portions. In other words, the ceramic material for the gap portions was the same as the ceramic material for the effective layer portion.

As a test, about 0.5V DC was applied to the multi-layered ceramic capacitors according to Example 3 (samples I, J, K and L) and the multi-layered ceramic capacitors according to Comparative Example 3 (sample M). The multi-layered ceramic capacitors were separated into defective products having an electrical resistance equal to or less than about $1.0 \times 10E6\Omega$ and non-defective products having an electrical resistance greater than about $1.0 \times 10E6\Omega$.

Thereafter, the multi-layered capacitors which were judged to be non-defective products were subjected to a damp heat test to check moisture resistance.

The test conditions were as follows: temperature: about 125° C., humidity: about 95% RH, applied voltage: about 5 V DC, and holding time: about 144 hours. After the test, when about 10 V DC was applied at room temperature, samples having a resistance equal to or less than about $1.0 \times 10E6\Omega$ were determined to be moisture resistance failure.

Table 3 shows the fraction of defective products before the damp heat test and the fraction of defective products after the damp heat test. The fraction of defective products before the damp heat test was the result of screening of 500 specimens of the samples I, J, K and L according to Example 3 and the sample M according to Comparative Example 3. The heat damp test was performed to 100 specimens of each of these samples which had been judged to be non-defective products as the result of screening, and the fraction of defective products was obtained after the damp heat test.

TABLE 3

|  | MgO content (mol) | Fraction defective before damp heat test | Fraction defective after damp heat test |
| --- | --- | --- | --- |
| Sample I (Example) | 1.5 | 0.20% | 0% |
| Sample J (Example) | 1.75 | 0% | 0% |
| Sample K (Example) | 2 | 0.40% | 0% |
| Sample L (Example) | 2.5 | 0.40% | 8% |
| Sample M (Comparative Example) | 1 | 0.40% | 19% |

As shown in Table 3, the fraction of defective products before the damp heat test of the multi-layered ceramic capacitors (samples) I, J, K and L according to Example 3 were substantially comparable to that of the multi-layered ceramic capacitors (sample) M according to Comparative Example 3 before the damp heat test. However, the fraction defectives after the damp heat test of the multi-layered ceramic capacitors (samples) I, K, and L according to Example 3 were significantly less than that of multi-layered ceramic capacitors (sample) M according to Comparative Example 3.

With respect to sample J in which a ceramic material prepared by adding about 1.75 mol of MgO to about 100 mol of the main component was used for the gap portions, the fraction of defective products before the damp heat test was 0%, and the fraction defective after the damp heat test was also 0%.

With respect to sample I, in which a ceramic material prepared by adding about 1.5 mol of MgO to about 100 mol of the main component was used for the gap portions, although the fraction of defective products before the damp heat test was about 0.20%, the fraction defective after the damp heat test was 0%. With respect to sample K, in which a ceramic material prepared by adding about 2 mol of MgO to about 100 mol of the main component, although the fraction defective before the damp heat test was about 0.40%, the fraction defective after the damp heat test was 0%.

With respect to sample L in Example, in which a ceramic material prepared by adding about 2.5 mol of MgO to about 100 mol of the main component was used for the gap portions, although the fraction defective before the damp heat test was about 0.40%, the fraction defective after the damp heat test was about 8%, which was significantly lower than that of the fraction defective of sample M according to Comparative Example 3. However, the fraction of defective products after the damp heat test of sample L was high compared to samples I, J, and K satisfying the requirements of the present invention.

Many of the specimens of sample M in Comparative Example 3 determined to non-defective products after the damp heat test had lower resistance values after the test compared with those before the test.

In each of the foregoing preferred embodiments and Examples 1 and 2, a Mg-free ceramic material is used for the effective layer portion. In Example 3, a Mg-contained ceramic material is used for the effective layer portion. Regardless of whether the ceramic material for the effective layer portion includes Mg or not, the Mg-rich regions have a Mg content greater than that of the effective layer portion within a predetermined range according to the present invention, thereby providing the basic advantages and effects of the present invention.

In the foregoing preferred embodiments and Examples, multi-layered ceramic capacitors have been described. However, the present invention is not limited to laminated ceramic capacitors and is widely applicable to various multi-layered ceramic electronic components, such as multi-layered thermistors and multi-layered inductors having internal electrodes containing Ni.

In addition, the present invention is not limited to the preferred embodiments described above. Various applications and modifications may be made to the structure of the ceramic layers and the internal electrodes, the number of layers, the types of ceramic materials for the effective layer portion, the side gap portions and the end gap portions, the composition of the material for the internal electrodes including Ni, and the like within the scope of the invention.

As described above, according to various preferred embodiments of the present invention, it is possible to improve the reliability of moisture resistance of the multi-layered ceramic electronic component having the structure including the internal electrodes arranged between the ceramic layers in the sintered ceramic body and to provide a small multi-layered ceramic electronic component having highly reliable moisture resistance.

Thus, the present invention is suitably applied to multi-layered ceramic components for various purposes, such as multi-layered ceramic capacitors, multi-layered thermistors, and multi-layered inductors.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A multi-layered ceramic electronic component comprising:
   a sintered ceramic body including a plurality of stacked ceramic layers, a first side surface and a second side surface opposing each other, and a first end surface and a second end surface opposing each other;
   a first internal electrode arranged in the sintered ceramic body, the first internal electrode having an end extending to the first end surface and including Ni;
   a second internal electrode arranged in the sintered ceramic body so as to oppose the first internal electrode with a ceramic layer therebetween, the second internal electrode having an end extending to the second end surface and including Ni;
   a first external terminal electrode arranged on the first end surface of the sintered ceramic body and electrically connected to the first internal electrode, the first external terminal electrode arranged to be subjected to a first potential; and
   a second external terminal electrode arranged on the second end surface of the sintered ceramic body and electrically connected to the second internal electrode, the second external terminal electrode being arranged to be subjected to a potential different from the first potential; wherein
   the sintered ceramic body includes:
   an effective layer portion of the ceramic layers arranged between the first internal electrode and the second internal electrode, the effective layer portion contributing to generation of capacitance; and
   side gap portions arranged between sides of the first and second internal electrodes and the first and second side surfaces of the sintered ceramic body and between sides of the effective layer portion and the first and second side surfaces of the sintered ceramic body; wherein
   in the side gap portions, regions each located on a level with each of the first and second internal electrodes and extending to the first and second side surfaces of the sintered ceramic body are Mg-rich regions each having a Mg concentration greater than that of the effective layer portion.

2. The multi-layered ceramic electronic component according to claim 1, wherein
   a first ceramic material defining the effective layer portion has a Mg content which is achieved by adding a first amount of Mg to about 100 mol of a primary material; and
   a second ceramic material defining the Mg-rich regions has a Mg content which is achieved by adding a second amount of Mg to about 100 mol of the primary material, the second amount being about 0.5 mol to about 1.0 mol greater than the first amount.

3. The multi-layered ceramic electronic component according to claim 1, wherein each of the Mg-rich regions has a concentration gradient such that the Mg concentration decreases as a distance from an outside toward an inside of the sintered ceramic body increases.

4. A multi-layered ceramic electronic component comprising:
   a sintered ceramic body including a plurality of stacked ceramic layers, a first side surface and a second side surface opposing each other, and a first end surface and a second end surface opposing each other;
   a first internal electrode arranged in the sintered ceramic body, the first internal electrode having an end extending to the first end surface and including Ni;

a second internal electrode arranged in the sintered ceramic body so as to oppose the first internal electrode with a ceramic layer therebetween, the second internal electrode having an end extending to the second end surface and including Ni;

a first external terminal electrode arranged on the first end surface of the sintered ceramic body and electrically connected to the first internal electrode, the first external terminal electrode arranged to be subjected to a first potential; and a second external terminal electrode arranged on the second end surface of the sintered ceramic body and electrically connected to the second internal electrode, the second external terminal electrode being arranged to be subjected to a potential different from the first potential; wherein the sintered ceramic body includes:

an effective layer portion of the ceramic layers arranged between the first internal electrode and the second internal electrode, the effective layer portion contributing to generation of capacitance; and side gap portions arranged between sides of the first and second internal electrodes and the first and second side surfaces of the sintered ceramic body and between sides of the effective layer portion and the first and second side surfaces of the sintered ceramic body; wherein in the side gap portions, at least regions that are adjacent to the first and second internal electrodes are Mg-rich regions each having a Mg concentration greater than that of the effective layer portion; and in the effective layer portion, a region that has a Mg concentration equal to or greater than those of the Mg-rich regions does not exist.

5. The multi-layered ceramic electronic component according to claim 4, wherein in the side gap portions, regions each located on a level with each of the first and second internal electrodes are the Mg-rich regions.

6. The multi-layered ceramic electronic component according to claim 4, wherein substantially the entire side gap portions are the Mg-rich regions.

7. The multi-layered ceramic electronic component according to claim 4, wherein the sintered ceramic body further includes end gap portions arranged between an end of the first internal electrode, the end of the first internal electrode not extending to the first surface, and the second end surface of the sintered ceramic body, between an end of the second internal electrode, the end of the second internal electrode not extending to the second end surface, and the first end surface of the sintered ceramic body, and between ends of the effective layer portion and the first end surface and the second end surface of the sintered ceramic body; and in the end gap portions, at least regions adjacent to the first and second internal electrodes are Mg-rich regions each having a Mg concentration greater than that of the effective layer portion.

8. The multi-layered ceramic electronic component according to claim 7, wherein the sintered ceramic body further includes, in the ceramic layers, side gap vertical extensions which are located outside an outermost internal electrodes and vertically extend from the side gap portions and end gap vertical extensions which are located outside the outermost internal electrodes and vertically extend from the end gap portions; and at least one of the side gap vertical extensions and the end gap vertical extensions of the ceramic layers are Mg-rich regions having a Mg concentration greater than that of the effective layer portion.

9. The multi-layered ceramic electronic component according to claim 4, wherein a first ceramic material defining the effective layer portion has a Mg content which is achieved by adding a first amount of Mg to about 100 mol of a primary material; and a second ceramic material defining the Mg-rich regions has a Mg content which is achieved by adding a second amount of Mg to about 100 mol of the primary material, the second amount being about 0.5 mol to about 1.0 mol greater than the first amount.

10. The multi-layered ceramic electronic component according to claim 4, wherein each of the Mg-rich regions has a concentration gradient such that the Mg concentration decreases as a distance from an outside toward an inside of the sintered ceramic body increases.

* * * * *